United States Patent
Bertoncello et al.

(10) Patent No.: US 8,475,165 B2
(45) Date of Patent: Jul. 2, 2013

(54) APPARATUS AND METHOD FOR TREATING A PRODUCT, FOR EXAMPLE A FOOD PRODUCT, AND RELATIVE PLANT

(75) Inventors: Simone Bertoncello, Galliera Veneta (IT); Luciano Mondardini, Tezze Sul Brenta (IT); Sandro Rasera, Cornuda (IT)

(73) Assignee: Pavan SRL, Galliera Veneta (PD) (IT)

( * ) Notice: Subject to any disclaimer, the term of this patent is extended or adjusted under 35 U.S.C. 154(b) by 999 days.

(21) Appl. No.: 12/537,601

(22) Filed: Aug. 7, 2009

(65) Prior Publication Data
US 2010/0035198 A1 Feb. 11, 2010

(30) Foreign Application Priority Data
Aug. 7, 2008 (IT) .............................. UD2008A0183

(51) Int. Cl.
*F27B 9/30* (2006.01)
(52) U.S. Cl.
USPC .............................. 432/59; 432/11; 99/443 R
(58) Field of Classification Search
USPC ................ 432/8, 11, 59; 198/867.11, 803.11, 198/803.14, 845, 846; 99/443 C, 443 R
See application file for complete search history.

(56) References Cited

U.S. PATENT DOCUMENTS

| | | | | |
|---|---|---|---|---|
| 1,557,368 A | * | 10/1925 | Kershaw et al. | 34/645 |
| 1,996,020 A | | 3/1935 | Hurxthal | |
| 2,125,654 A | | 8/1938 | Schiff | |
| 2,895,732 A | | 7/1959 | Coburn | |
| 3,928,638 A | | 12/1975 | Stickle | |
| 3,946,655 A | * | 3/1976 | Schy | 99/404 |
| 4,380,191 A | * | 4/1983 | Gallegos et al. | 99/404 |
| 6,164,440 A | * | 12/2000 | Van Bree | 198/867.11 |
| 8,020,487 B2 | * | 9/2011 | Nordby et al. | 99/443 C |

FOREIGN PATENT DOCUMENTS

| | | |
|---|---|---|
| CH | 299341 A | 6/1954 |
| DE | 293 418 c | 8/1916 |
| DE | 37 12 765 A1 | 3/1988 |

* cited by examiner

*Primary Examiner* — Gregory A Wilson
(74) *Attorney, Agent, or Firm* — Panitch Schwarze Belisario & Nadel LLP

(57) ABSTRACT

An apparatus for treating a product comprises movement means able to move the product in a direction of feed through at least a treatment sector, the treatment being temporally defined by a predetermined duration. The movement means comprise at least a conveyor belt closed in a ring that supports the product and extends along a path between an entrance and an exit of the treatment sector. The conveyor belt is at least partly made of flexible material and is able to be disposed along the path in a plurality of loops, which develop in a direction substantially transverse with respect to the direction of advance, so that the product follows the loops along the path.

12 Claims, 2 Drawing Sheets

APPARATUS AND METHOD FOR TREATING A PRODUCT, FOR EXAMPLE A FOOD PRODUCT, AND RELATIVE PLANT

FIELD OF THE INVENTION

The present invention concerns an apparatus for treating a product, for example, but not only, a food product, such as pasta, which needs a treatment during production.

In particular, the present invention is used, advantageously but not restrictively, to heat treat long pasta, of various sizes and thicknesses, like pasta sheets, lasagna, tagliatelle, spaghetti or similar.

It is understood that the present invention can also be applied to the treatment of other types of products and materials, such as plastic, fabric, composite materials or the like, which extend in length for a certain extent, or they have a length much greater than the width and/or thickness The present invention also concerns the relative method and the plant for treating said product.

In the following description specific reference will be made to the application of the invention to the field for the treatment of pasta, it being understood that what is described and claimed can also be applied to other fields as indicated above.

BACKGROUND OF THE INVENTION

The industrial treatment of long pasta is known, by means of automated treatment devices in which the pasta is made to pass through a fluid, for example water, water vapor, air or other means, able to carry out the desired treatment on the pasta, for example cooking, or pre-cooking. The treatments are typically carried out downstream of the machine that forms the pasta.

It is also known that long pasta may need, during or after the production process, one or more steps of rest or stabilization, or simply of storage, during which it is necessary to give support to the product for the time needed to complete the step cited.

In particular, a first treatment device for pasta is known with a linear extension, in which the movement of the pasta with respect to the fluid occurs by means of a conveyor belt in a tank containing the fluid.

A second device is known of the suspended type in which the pasta is suspended from transverse bars which run on chains along the length of the tank containing the fluid.

As the length of the tank is directly proportional to the speed of feed and to the cooking time of the pasta, the use of these two types of known device, in the case of pasta of a greater thickness and/or in the case of higher speeds of feed, causes considerable horizontal bulk of the treatment plant.

A third device with a vertical extension is also known, in which the development of the conveyor belt for the pasta is on several levels. This brings about problems relating to the raising of the level of the fluid and consequent height of the tank. In fact, the need to vary the level of the fluid causes an increased consumption of energy, and the height of the tank makes the bottom of the tank difficult to access for maintenance operations.

A device is also known for treating pasta which provides the use of frames equipped with rollers which rotate reciprocally, allowing the immersion of the pasta in the tank of fluid, with a substantially zigzag path. If the pasta breaks, this means the plant has to be re-started and the pieces of broken pasta have to be removed from the bottom of the tank only by emptying the tank itself.

Purpose of the present invention is to make an apparatus, and perfect a method and a relative plant for the treatment of products, for example, but not only, food products, which overcome the disadvantages of the state of the art.

The Applicant has devised, tested and embodied the present invention to overcome the shortcomings of the state of the art and to obtain these and other purposes and advantages.

SUMMARY OF THE INVENTION

The present invention is set forth and characterized in the respective independent claims, while the dependent claims describe other characteristics of the invention or variants to the main inventive idea.

In accordance with said purpose, an apparatus according to the present invention is used for treating a product, such as, but not exclusively, a pasta of varying size or thickness, for example long pasta such as lasagna, spaghetti, tagliatelle etc.

The apparatus according to the present invention comprises movement means able to move the product in a determinate direction of through at least a treatment sector, said treatment being temporally defined by a predetermined duration.

In the context of the present invention, by treatment we intend a heat treatment, a non-heat treatment, conditioning, rest or stabilization or even storage of the product.

The movement means comprise at least a conveyor belt closed in a ring, able to support the food product and which extends along a path between an entrance and an exit of said treatment sector.

The entrance and the exit of the treatment sector are defined by a respective sector upstream, or first sector, and by a respective sector downstream, or second sector.

In a non-restrictive solution of the present invention, the upstream sector defines a loading sector for the product to be introduced into the treatment sector, while the downstream sector defines an unloading sector of the product after treatment.

The upstream sector can be, for example, even a press, or other similar or comparable machine, which feeds the product to be treated continuously or discontinuously.

The upstream and downstream sectors can both be present, or only one of them can be present.

In the present invention, the conveyor belt is at least partially made of a flexible material so that it can be disposed along said path in a plurality of loops, which develop in a direction substantially transverse with respect to said direction of feed, so that the food product follows said loops along said path.

According to one solution of the invention, the loops formed by the conveyor belt are achieved in a vertical direction and are close to each other.

In particular the loops develop perpendicular and toward the bottom with respect to the direction of feed of the product.

According to the invention, the conveyor belt is associated with at least two distinct transport systems, a first transport system being disposed at least in correspondence with one of either said first sector or upstream sector, and said second sector, or downstream sector, and a second transport system being disposed in correspondence with said treatment sector.

Moreover, according to the present invention, a plurality of bars, disposed transverse to the direction of feed, render the conveyor belt solid with the relative transport system, the positioning pitch of said bars on said second transport system being less than the positioning pitch of the bars on said first transport system, to automatically create a plurality of loops on said conveyor belt, of a depth correlated to said pitch, in correspondence with said treatment sector.

Given the same speed of advance of the belt, the same duration of the treatment cycle, and the same thickness of the sheet, the loops thus created allow to reduce the sizes needed for containing and supporting the product, advantageously, in the case of the treatment chamber, it reduces the sizes thereof.

Advantageously, the number and the depth of said loops are directly correlated to the duration of said treatment, so as to minimize or reduce the sizes of the treatment sector.

The treatment sector can be comprised inside a treatment chamber, selectively closable and suitable to cause the product to interact, for example, with a fluid supplied in the same sector, for example a heat-carrying fluid such as water, steam, hot air etc., or an inert gas, such as $CO_2$ or nitrogen. Or more simply, where only a standing period is required for the product, the treatment sector can make up only a part of the path of the conveyor belt.

According to the present invention, the movement means of the apparatus are downstream of the forming machine or of another preceding step in the process of the food product. In this way, the apparatus can form part of a plant for the treatment of a food product, such as pasta of various size or thickness, which also comes within the scope of the present invention.

A particular advantage derives from using the present invention with food products such as fresh pasta which have an oblong shape and are therefore more flexible and malleable transversely, such as tagliatelle, lasagna or other pasta of the thread or ribbon type. This type of product easily adapts to the loop shape of the conveyor belt and in this case the saving in size is clear.

The present invention also concerns a method for treating a food product, associated with a plant comprising at least an apparatus for treating a food product, such as pasta of various size or thickness, which comprises at least a treatment sector provided with a conveyor belt closed in a ring. The method provides at least a treatment step of the food product, said treatment being temporally defined by a predetermined duration, in which the food product is transported, at least in the treatment sector, according to a path conformed as vertical loops one after the other and close together, without there being any substantial reciprocal movement between the food product and the conveyor belt which supports it and positions it.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

With reference to the attached drawings, an apparatus 10 according to the present invention is used to treat a food product such as long pasta, such as for example, to give a non-restrictive example, lasagna, tagliatelle, spaghetti or suchlike.

Figure 1:
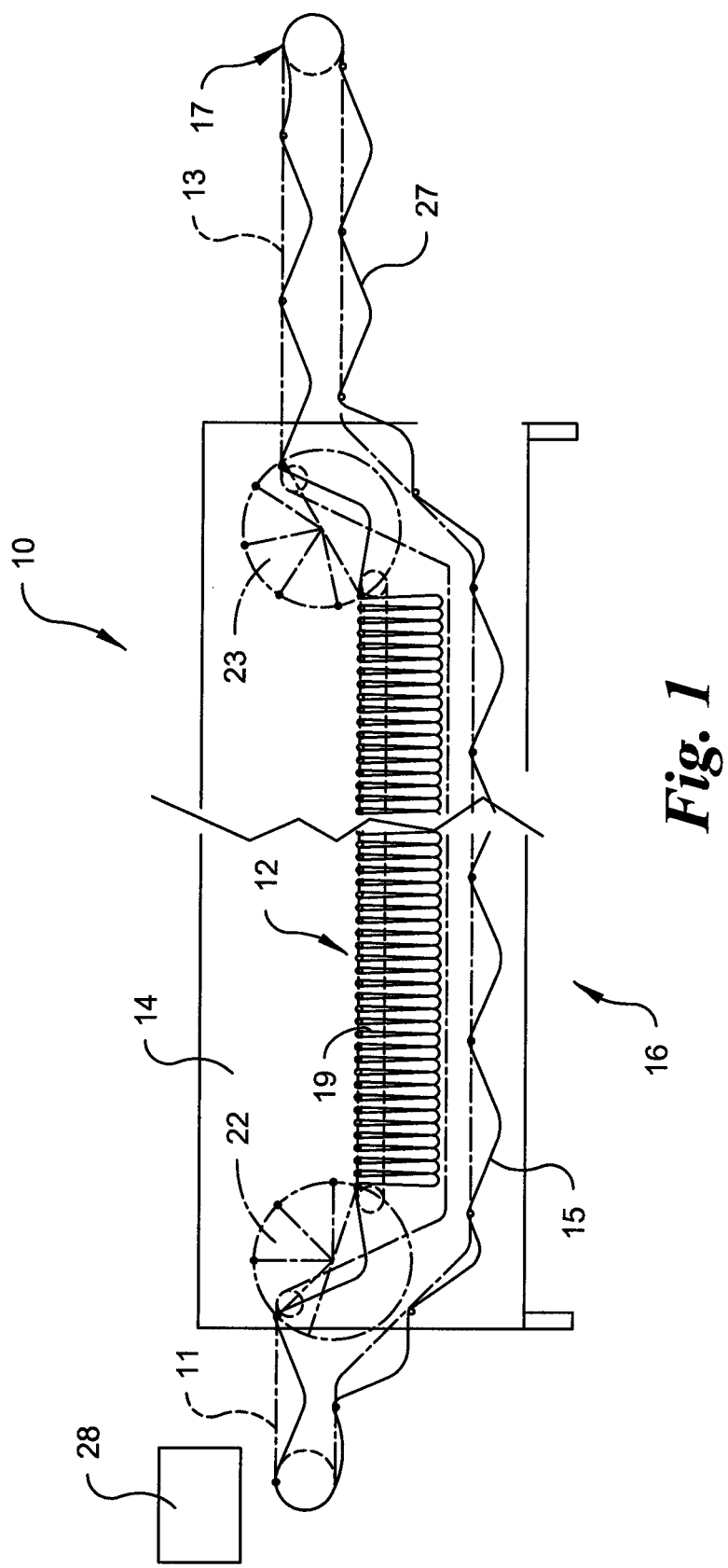
FIG. 1 shows an apparatus for treating a food product according to the present invention.
Figure 2:
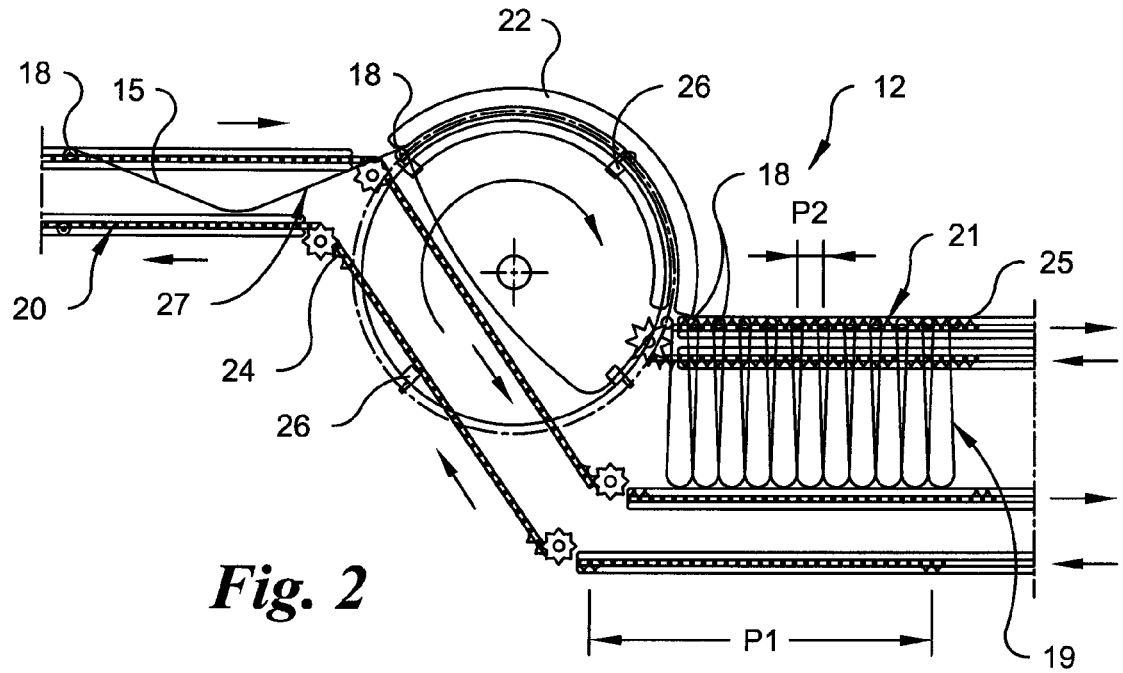
FIG. 2 shows an enlarged detail of the apparatus in FIG. 1.
Figure 3:
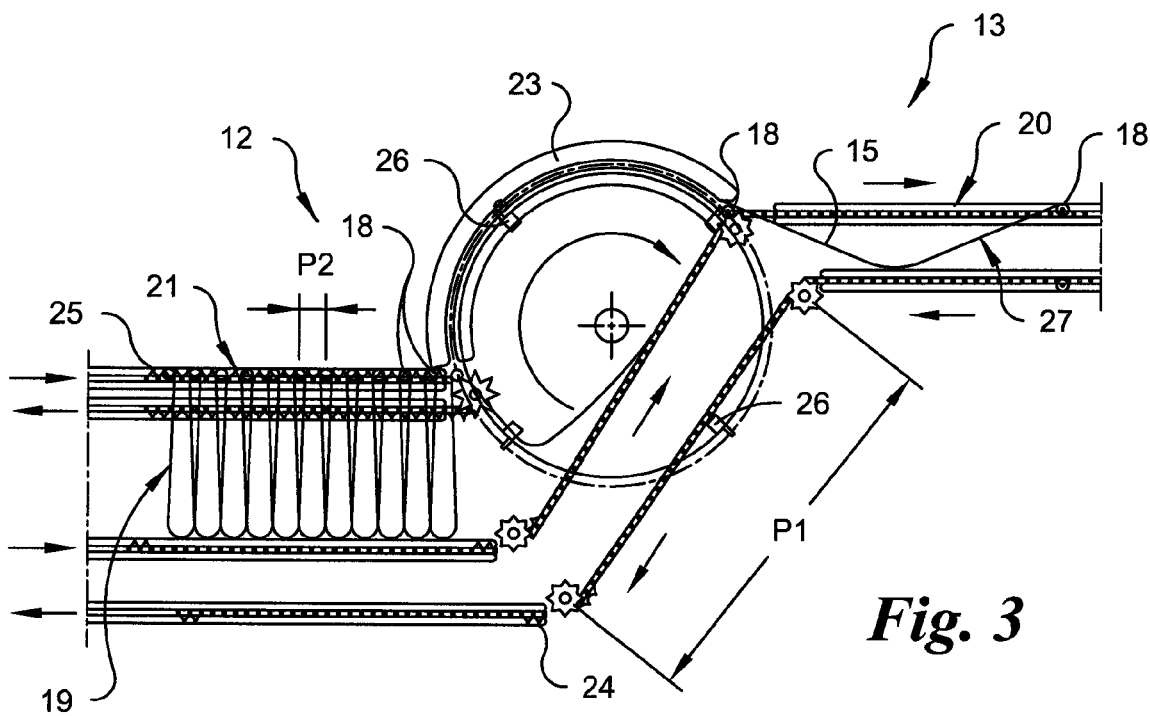
FIG. 3 shows an enlarged detail of the apparatus in FIG. 1.

With particular reference to FIG. 1, the apparatus 10 according to the present invention comprises a treatment chamber 14, a conveyor belt 15, closed in a ring and passing partly inside a treatment sector 12 of the treatment chamber 14, and a movement device 16 which moves and positions the conveyor belt 15 following a path P between an entrance and an exit of the treatment sector 12, in a determinate direction of advance X.

The conveyor belt 15 is made of flexible material and is thus suitable to shape, along the path P, a plurality of loops 19 in a vertical direction.

A fluid to treat the pasta can be present in the treatment sector 12.

For example, but not in such a way as to restrict the scope of the present invention, the fluid can be a heat-carrying fluid for the heat treatment of the pasta, or another type of fluid, such as an inert gas. In this case, the treatment chamber 14 is of the selectively closable type, suitable to carry out the heat treatment or the determinate treatment selected.

The apparatus 10 also provides a first sector, in this case a loading sector 11, upstream of the treatment sector 12, and a second sector, in this case an unloading sector 13, downstream of the treatment sector 12.

The movement device 16 is able to move the conveyor belt 15 from the loading sector 11, through the treatment sector 12, to the unloading sector 13.

The movement device 16 comprises transport means 17 and translation means 22 and 23, able to cooperate with each other to move the conveyor belt 15.

In this case, the transport means 17 comprise two pairs of chain transporters 20 and 21 and a series of guides and pinions.

The conveyor belt 15 comprises a flexible mat, solid with a plurality of transverse bars 18, joined to it with a definite pitch.

The conveyor belt 15 bends between one and the other of the gaps defined by the pitch of the bars 18, creating said loops 19.

The transverse bars 18 have a greater length than the width of the conveyor belt 15 and are able to support the conveyor belt 15.

The first pair of chain transporters 20 develop in correspondence with the loading sector 11, the treatment sector 12 and the unloading sector 13. The second pair of chain transporters 21 develop in correspondence with the treatment sector 12.

In the treatment sector 12, the first pair of chain transporters 20, in order not to interfere with the second pair of chain transporters 21, moves on a lower level with respect to the latter.

According to a variant, the first pair of chain transporters 20, in the treatment sector 12, move on a higher level with respect to the second pair of chain transporters 21.

The pairs of chain transporters 20 and 21 comprise two parallel chains, distanced by a length at least equal to the width of the conveyor belt 15 and which move at the same speed.

The pairs of chain transporters 20 and 21 also comprise a plurality of fixed teeth 24 and 25, conformed to cooperate removably with the bars 18, maintaining them in a horizontal position and making them advance solid with each pair of chain transporters 20 and 21.

The pitch p1 of the teeth 24 of the first pair of chain transporters 20 is greater than the pitch p2 of the teeth 25 of the second pair of chain transporters 21.

In this case, according to a first formulation, the pitch p1 can cause the conveyor belt 15 to be tensioned between one transverse bar and another.

According to another formulation, the pitch p1 is less than the length of the conveyor belt 15 between one transverse bar and the next.

The pitch p2 is such that the loops 19 are close together and such that their depth is such as not to interfere with what is underneath them.

A first pair of translation means 22, for example a rotating disc, cooperating with the first pair of chain transporters 20 and with the second pair of chain transporters 21, is immediately upstream of the treatment sector 12.

Said first translation means 22 comprise opposite hooks 26, disposed radially on the respective edge of the translation means 22 and conformed to cooperate removably with the transverse bars 18 so as to take them and support them near the ends.

The removability intervenes when the transverse bars 18 are released.

The speed of rotation of the first translation means 22 and the distance between the hooks 26 are coordinated to pitches p1 and p2 and to the speed of advance of the two pairs of chain transporters 20 and 21.

A second pair of translation means 23, similar to the first pair of translation means 22, is placed immediately downstream of the treatment sector 12.

Said second translation means 23 cooperate with the bars 18 in a removable way.

The apparatus described heretofore, which defines the method according to the present invention, functions as follows.

The pasta, arriving from a forming machine situated upstream of the apparatus 10 and not shown in the drawings, or from other preceding process steps, is laid on the conveyor belt 15, the transverse bars 18 of which are on the first pair of chain transporters 20. Each of the ends of the transverse bars 18 are in correspondence with the teeth 24 of each chain transporter of the first pair of chain transporters 20.

Immediately upstream of the treatment sector 12, the first translation means 22 lift each bar 18 by means of hooks 26, from the first pair of chain transporters 20 and, by means of a rotation movement of the first translation means 22, deposit it on the second pair of chain transporters 21, positioning each of the ends of the bars 18 in correspondence with the teeth 25 of each chain transporter of the second pair of chain transporters 21.

Since the pitch p2 of the teeth 25 is less than the pitch p1 of the teeth 24, the bars 18 on the second pair of chain transporters 21 are at a shorter distance with respect to that where they were on the first pair of chain transporters 20, with the consequent bending of the conveyor belt 15 downward, so as to form loops 19 which are deeper with respect to the loops 27 which formed in correspondence with the first pair of chain transporters 20.

Given the same speed of advance of the conveyor belt 15, the same time it passes in the fluid and the same thickness of the pasta, the formation of the loops 19 allows to reduce the sizes of the treatment chamber 14.

Similarly, immediately downstream of the treatment sector 12, the second translation means 23 lift each bar 18, by means of the hooks 26, from the second pair of chain transporters 21 and, by means of a rotation movement of the second translation means 23, deposit it on the first pair of chain transporters 20, positioning each of the ends of the bars 18 in correspondence with the teeth 24 of each chain transporter of the first pair of chain transporters 20.

The distance between the bars 18 is therefore again equal to pitch p1, greater than pitch p2 and, consequently, the conveyor belt 15 is tensioned.

The pasta is unloaded, with known methods, onto other transport means, not shown in the drawings and situated downstream from the unloading sector, to be taken to the next treatments.

The conveyor belt 15 completes a return path in the part underneath the first pair of chain transporters 20.

According to a variant, the transport means comprise three pairs of chain transporters, in correspondence, respectively, with the treatment sector 12, the loading sector 11 and the unloading sector 13.

According to another variant, the transport means comprise conveyor belts.

According to another variant the first and the second translation means comprise a link block mechanism.

It is clear, however, that modifications and/or additions of parts may be made to the apparatus 10 as described heretofore, without departing from the field and scope of the present invention.

The invention claimed is:

1. An apparatus for treating a product including one of pasta, fabric, plastic or other of a long and continuous shape, comprising at least a conveyor belt closed in a ring and able to move the product in a direction of feed in sequence through at least a treatment sector associated upstream with a first sector and downstream with a second sector,
   wherein said conveyor belt is at least partly made of flexible material, and
   wherein said conveyor belt is associated with at least two distinct transport systems,
   a first transport system being disposed at least in correspondence with one of either said first sector, or upstream sector, and said second sector, or downstream sector, and a second transport system being disposed in correspondence with said treatment sector,
   a plurality of bars disposed transverse to the direction of feed rendering said conveyor belt solid with the relative transport system, and
   wherein the positioning pitch (p2) of said bars on said second transport system is less than the positioning pitch (p1) of the bars on said first transport system, to automatically create a plurality of loops on said conveyor belt, of a depth correlated to said pitch (p2), in correspondence with said treatment sector, and wherein the first and the second transport system each comprise two adjacent chains which bear teeth suitable to support and position the transverse bars in relation to the respective pitches (p1) and (p2).

2. The apparatus as in claim 1, wherein the loops develop in a direction substantially transverse with respect to said direction of feed, so that the product follows said loops along said path.

3. The apparatus as in claim 1, wherein the number and the depth of said loops are correlated to the length of said treatment so as to minimize or reduce the sizes of the treatment sector.

4. The apparatus as in claim 1, wherein a treatment fluid which at least surrounds said loops is present or supplied in the treatment sector.

5. The apparatus as in claim 4, wherein the treatment fluid is a heat-carrying fluid to effect a heat treatment of the product.

6. The apparatus as in claim 5, wherein the treatment sector is comprised inside a treatment chamber selectively closable and suitable to perform a heat treatment.

7. The apparatus as in claim 1, wherein the speeds of translation of the first transport system and of the second transport system are in ratio to the respective distances between the transverse bars.

8. The apparatus as in claim 1, wherein the first transport system, in the treatment sector, passes under the second transport system at a distance coordinated with the height of the loops formed by the conveyor belt in said treatment sector.

9. A plant for treating a product, such a product with a long shape, comprising an apparatus as in claim 1, associated upstream with a device to load the product and downstream with a device to unload the product.

10. A method for treating a product, associated with a plant comprising at least a treatment apparatus as in claim 1, providing at least a step of treating the product, said treatment being temporally defined by a predetermined duration, wherein the product is transported at least in a treatment sector according to a path conformed as vertical loops, following each other and close together, without there being any substantial reciprocal movement between the product and the conveyor belt which supports and positions the product.

11. The method as in claim 10, wherein the duration of said treatment is directly correlated to the number and depth of said loops, so as to minimize or reduce the sizes of the treatment sector.

12. An apparatus for treating a product including one of pasta, fabric, plastic or other of a long and continuous shape, comprising at least a conveyor belt closed in a ring and able to move the product in a direction of feed in sequence through at least a treatment sector associated upstream with a first sector and downstream with a second sector, wherein said conveyor belt is at least partly made of flexible material, and wherein said conveyor belt is associated with at least two distinct transport systems, a first transport system being disposed at least in correspondence with one of either said first sector or u s stream sector and said second sector or downstream sector and a second transport system being disposed in correspondence with said treatment sector, a plurality of bars disposed transverse to the direction of feed rendering said conveyor belt solid with the relative transport system, and wherein the positioning pitch (p2) of said bars on said second transport system is less than the positioning pitch (p1) of the bars on said first transport system, to automatically create a plurality of loops on said conveyor belt, of a depth correlated to said pitch (p2), in correspondence with said treatment sector, wherein between the first transport system and the second transport system there are first translation means of the transverse bars which pick up, from the first transport system, the transverse bars distanced with pitch (p1), and deposit them on the second transport system with pitch (p2).

* * * * *